United States Patent [19]

Stiles

[11] 3,993,597

[45] Nov. 23, 1976

[54] CATALYTIC COATING COMPOSITION FOR COOKING DEVICES

[75] Inventor: Alvin Barber Stiles, Wilmington, Del.

[73] Assignee: E. I. Du Pont de Nemours and Company, Wilmington, Del.

[22] Filed: Feb. 26, 1975

[21] Appl. No.: 553,425

Related U.S. Application Data

[63] Continuation-in-part of Ser. No. 472,423, May 22, 1974, abandoned.

[52] U.S. Cl. ................................ 252/454; 252/457; 252/458; 252/459; 252/471; 126/19 R

[51] Int. Cl.[2] ..................... B01J 29/00; B01J 29/10; B01J 29/20

[58] Field of Search ........... 252/454, 457, 458, 459, 252/471; 126/19

[56] References Cited

UNITED STATES PATENTS

| | | | |
|---|---|---|---|
| 3,361,531 | 1/1968 | Erb et al. | 252/454 X |
| 3,460,523 | 8/1969 | Stiles et al. | 252/454 X |

*Primary Examiner*—Carl F. Dees

[57] ABSTRACT

A catalyst composition for coating surfaces of cooking devices exposed to cooking residues is disclosed. The composition contains (1) from about 10–94% by weight of a catalytic metal oxide selected from the group consisting of the oxides of cobalt, chromium, iron, nickel, manganese, copper, zinc, the rare earths, and mixtures thereof in the form of particles having a size of less than 35 microns and said oxide having a surface area of about 5–150 square meters per gram, with the proviso that when the oxide is manganese oxide from 0–80% by weight of said oxide can have a surface area in excess of about 150 square meters per gram; (2) at least 1% by weight on a dry basis of an alkaline silicate, said alkaline silicate being in the form of an aqueous solution; and (3) from about 0–20% by weight of a carbonate or hydroxide of one or more metals of said catalytic metal oxides when the catalytic metal oxide of (1) is manganese oxide and from about 1–20% by weight of the carbonate or hydroxide when the catalytic metal oxide of (1) is other than manganese oxide. Surfaces coated with the disclosed composition effect rapid decomposition and oxidation of cooking residues at temperatures of about 204° C. (400° F.) and lower.

26 Claims, No Drawings

CATALYTIC COATING COMPOSITION FOR COOKING DEVICES

CROSS-REFERENCE TO RELATED APPLICATIONS

This application is a continuation-in-part of my co-pending application Ser. No. 472,423, filed on May 22, 1974, and now abandoned.

BACKGROUND OF THE INVENTION

1. Field of Invention

This invention relates to a catalytic composition for coating the surfaces of cooking devices exposed to cooking residues thereby providing a porous film or surface containing catalytic materials which effect decomposition and oxidation of said residue. The invention is also directed to surfaces coated with the catalytic composition.

2. Prior Art

U.S. Pat. No. 3,266,477 issued to Stiles on Aug. 16, 1966 discloses use of oxidation catalysts in cooking devices to remove food and other cooking residues by catalytic oxidation. The patent teaches that use of the catalysts permits the cleaning of cooking devices at low oxidation temperatures so that the cooking devices are self-cleaning at temperatures of 204° to 260° C. (400° to 500° F.).

U.S. Pat. No. 3,271,322 issued to Stiles on Sept. 6, 1966 discloses a catalytic surface for cooking devices wherein the surface is composed of catalysts supported upon a particulate carrier which is anchored to a coating of polytetrafluoroethylene, said polytetrafluoroethylene being adhered to the surface of the cooking device.

U.S. Pat. No. 3,460,523 issued to Stiles et al. on Aug. 12, 1969 discloses a composition which is useful for coating the walls of cooking devices to provide a porous film containing catalytic materials. The composition contains at least 5% by weight on a dry basis of an alkaline silicate and at least 10% by weight of a thermally stable oxidation catalyst which is selected from the oxygencontaining compounds of zirconium, titanium, vanadium, chromium, manganese, cobalt, iron, nickel, tungsten, molybdenum, copper, zinc, the rare earths; the precious elements comprising rhenium, ruthenium, osmium, iridium, and platinum, and their mixtures. The patent teaches that the requisite oxidation catalyst should have a specific surface area of at least 0.1 square meter per gram. Coated surfaces made with those disclosed compositions are said to consist of a supported porous film having a porosity greater than 15% by volume.

In spite of the usefulness of the above-described compositions, there still exists a need for a catalytic coating composition which provides a catalytic surface effecting rapid disappearance of cooking residues at cooking temperatures of about 204° C. (400° F.) and below.

SUMMARY OF THE INVENTION

An improved catalyst composition has been discovered whereby surfaces coated therewith are provided with a film containing catalytic material to effect decomposition and oxidation of cooking residue.

Specifically, the catalyst composition of the invention contains (1) from about 10–94% by weight of a catalytic metal oxide selected from the group consisting of the oxides of cobalt, chromium, iron, nickel, manganese, copper, zinc, the rare earths and mixtures thereof, (2) at least 1% by weight on a dry basis of an alkaline silicate selected from the group consisting of sodium silicate, lithium silicate, potassium silicate, silicates of organic bases having a basic dissociation constant greater than $10^{-3}$ and mixtures thereof; and (3) from about 0–20% by weight of a carbonate or hydroxide of one or more metals of said catalytic metal oxides when the catalytic metal oxide of (1) is manganese oxide and from about 1–20% by weight of said carbonate or hydroxide when the catalytic metal oxide of (1) is other than manganese oxide. The catalytic metal oxide of component (1) is in the form of particles having a size of less than 35 microns and a surface area of about 5–150 square meters per gram with the proviso that when the oxide is manganese oxide from 0–80% by weight of said oxide can have a surface area in excess of about 150 square meters per gram. Optionally, a refractory filler, humectant, and a thixotropic agent may be added to the composition of the invention.

This invention is further directed to cooking surfaces comprising a support coated with the catalyst composition and fired at temperatures above about 204° C., said surface having a porosity ranging from about 10–30%, a hardness in excess of 3 on Moh's scale and losing no more than 15% of its initial porosity at 260° C., when heated to temperatures up to 649° C. Coated surfaces of the invention catalyze decomposition and oxidation of cooking residue at temperatures of about 204° C. and lower the result in rapid removal of said residue.

Finally, this invention is further directed to a process for making a surface coated with a preferred catalyst composition containing manganese oxide, said process comprising the steps of (1) pulverizing manganese oxide in the form of particles having a size of greater than 35 microns and at least 20% by weight of which have a surface area of from about 5–150 square meters per gram to reduce the particle size to less than 35 microns; (2) preparing a catalytic coating composition by mixing manganese oxide from step (1) in an amount of about 10–94% by weight with at least 1% by weight on a dry basis of an alkaline silicate selected from the previously described group, said weight percentages being based on the weight of the total composition; (3) coating a support with the catalytic composition of step (2); and (4) firing the coated support at a temperature above about 204° C.

DETAILED DESCRIPTION OF THE INVENTION

The catalytic metal oxides used in the catalyst coating compositions of the invention are selected from the oxides of cobalt, chromium, iron, nickel, manganese, copper, zinc, the rare earths, and mixtures thereof. Such materials have long been known in the art, used either alone or in conjunction with one another, either in the form of fluidized beds or in the form of pellets, and have been used for a variety of oxidation reactions. Thus, various oxides and oxide mixtures such as manganese dioxide, the manganates or manganites of iron, nickel, tungsten, copper, and zinc, etc. are known oxidation catalysts.

Preferred catalytic metal oxides include oxides of manganese, cobalt, nickel, and their mixtures with one another, manganese oxide being more preferred, and manganese dioxide being most preferable. The expression "manganese oxide" as used herein is meant to include MnO, $Mn_3O_4$, $Mn_2O_3$, $MnO_2$ or any mixture thereof. Particularly preferred are those compositions wherein one or more of the above elements are present in more than one valence state or may achieve more than one valence state for at least a transient period during the course of oxidative cracking or simple oxidation reactions. So-called oxidation reactions are very complex and encompass cracking, dehydrogenation, free radical formation and other reactions occurring simultaneously therewith. As used herein the expression "decomposition and oxidation" is to be understood to include these various reactions which occur during so-called oxidation reactions.

The amount of catalytic metal oxide in the composition of the invention is from about 10 to about 94% by weight of the total composition. The metal oxide used in the present compositions has a surface area of about 5–150 square meters per gram with the proviso that when the oxide is manganese oxide from 0–80% by weight of it can have a surface area in excess of about 150 square meters per gram. In general, since catalytic activity increases in a manner directly proportional to surface area, the preferred catalytic metal oxides have a surface area exceeding 10.0 square meters per gram; and the surface area of the most preferred catalytic metal oxides will exceed 15.0 square meters per gram.

The crystallite size of the catalytic metal oxide should be 250 angstroms or less. In a highly preferred embodiment of the invention amorphous manganese dioxide is employed as the catalytic metal oxide. By amorphous, it is meant that the manganese dioxide particles do not display on an X-ray diffraction pattern the Laue lines characteristic of crystallinity. Thus, some kind of orientation of the manganese dioxide is possible provided it does not attain the regularity of crystallinity.

In the composition of the invention the catalytic metal oxide is in the form of particles having a size of less than 35 microns, preferably less than 5 microns and most preferably less than 2 microns. It is to be understood that the expression "particles having a size of less than" and "particle size less than" as used herein mean that about 100% of the material passes through a sieve having openings of the specified dimension or that when the material is viewed under an electron microscope no particles have a size greater than the specified value.

Since even amorphous manganese dioxide may be agglomerated, reduction of particle size to increase the availability of catalytic surface is important. However, reduction of the particle size of the catalytic metal oxide is alone not sufficient to achieve a catalytic coating composition capable of producing catalytic surfaces having the properties described herein. The catalytic metal oxide must inherently possess a surface area within the aboveprescribed range in order for the reduced particle size to be effective in rendering a catalytic coating composition capable of effecting rapid oxidation and decomposition of cooking residues at temperatures of 204° C. (400° F.) and lower.

Reduction of the particle size below 35 microns combined with the addition of a metal carbonate or hydroxide as disclosed herein renders a catalyst composition which provides a surface effecting rapid oxidation of cooking residues at temperatures of 204° C. (400° F.) and lower. In a preferred embodiment using manganese oxide as a catalyst, reduction of particle size of the manganese oxide having the requisite surface area is alone sufficient for producing a catalytic coating composition which provides surfaces having the desired properties. The pulverization of the catalytic metal oxide can be accomplished by techniques which are well known in the art, such as mechanical grinding.

From U.S. Pat. No. 3,460,523 it is known that the catalytic activity of surfaces obtained from coating compositions such as those of the invention are related, for any specific catalyst, to the surface area of the catalyst, to the thickness of the supported film, and to the concentration of catalyst present in the film. The most preferred compositions are therefore those which maximize these three factors while maintaining good properties in regard to mechanical abrasion resistance, water resistance, porosity, and mechanical strength and hardness. Thus, catalyst surface area, catalyst concentration and the bed thickness of the porous film should be as high as possible.

In this regard, it has been discovered that the addition of a carbonate or hydroxide of the metals of the above-described oxides to the catalytic coating composition will enhance the catalytic properties of the coated surfaces obtained by use of these compositions. In the coating compositions of the invention the metal carbonate or hydroxide is present in amounts ranging from about 0 to about 20% by weight when the catalytic metal oxide is manganese oxide and from 1 to about 20% by weight when the other catalytic metal oxides are used. In the present invention the carbonate or hydroxide compound is in the form of particles having a size of about 149 microns (−100 mesh) or less. If the carbonate or hydroxide is added to the catalytic metal oxide before pulverizing, the former will have particles with a size of less than 35 microns. For carbonates and hydroxides having particles of less than 35 micron size, amounts from about 1–8% by weight will usually suffice for purposes of the invention. The inclusion of the metal carbonate or hydroxide imparts greater porosity and surface area to the films obtained when the compositions of the invention are coated on cooking surfaces and the coated surfaces are then fired. The combination of the decomposition of the carbonate or hydroxide with the reduced particle size of the catalytic metal oxide produces a coated surface effecting rapid oxidation of cooking residues at temperatures of 204° C. (400° F.) or less. In a preferred embodiment of the invention the catalytic metal oxide and the metal carbonate are the oxide and carbonate of manganese. Moreover, as mentioned previously, when the metal oxide is manganese oxide having particles of the requisite size, it alone is sufficient for producing a catalytic coating composition whih provides surfaces having the desired properties.

The catalyst coating compositions of the invention also contain an alkaline silicate binder selected from the group consisting of lithium, sodium and potassium silicates, their mixtures and the silicates of strong organic bases, such as guanidine, tetramethylammonium hydroxide, tetraethylammonium hydroxide, and their mixtures as taught by U.S. Pat. No. 3,460,523. The silicates of the strong organic bases have a basic dissociation constant greater than $10^{-3}$. The teachings of U.S. Pat. No. 3,460,523 with respect to the operable alkaline silicates are incorporated herein by reference.

Generally, the alkaline silicates are used in the form of their aqueous solutions. Solutions of alkali metal silicates can have a considerable range of mole ratios of silica to metal oxide and are available commercially in such a range of ratios and concentrations. Usually, the film-forming ability of alkali metal silicates is better the lower the mole ratio of silica to alkali metal oxide, whereas water resistance improves with the increase in this ratio.

Useful compositions for the purposes of this invention include sodium silicates having mole ratios of silica to sodium oxide ranging from about 2 to 4.5, lithium silicates having mole ratios of silica to lithium oxide of from about 2 to about 10 or 12, and potassium silicates having mole ratios of silica to potassium oxide of from about 2 to about 5. Since these silicates are normally available in the form of aqueous solutions having concentrations varying from about 20 to about 35% by weight, this range of concentrations will generally be used with the preparation of the compositions of the invention with solutions having concentrations of at least 30% by weight being preferred. Sodium silicate is the preferred binder for the coating compositions of the invention.

The alkaline silicate must make up at least 1% by weight, on a dry basis, of the catalytic coating compositions of the invention, and preferably 2% by weight. In general, the films or coatings made from the compositions of the invention become harder, stronger and tougher as more silicate is used; however, this beneficial effect and, hence, the maximum amount of alkaline silicate included in the instant compositions are limited by the desirability of having the catalyst concentration as high as possible and of maintaining adequate porosity.

It is often advantageous to include in the catalytic coating compositions of the invention up to about 70%, preferably about 20–35%, and most preferably about 25–30%, by weight of a refractory, substantially water-insoluble filler to improve the toughness of the film and for other purposes. Such material may be selected from the thermally stable, oxygen-containing compounds of lithium, sodium, potassium, magnesium, calcium, barium, aluminum, titanium, zinc, boron, phosphorus and silicon, with the proviso that the alkali metal and phosphorus compounds contain at least one other element of the group. Specific examples of suitable fillers include the aluminosilicate clays, such as kaolin; magnesium silicates, such as talc, chrysotile asbestos and hextorite clay. A preferred filler is ilmenite, $FeTiO_3$. Also included in the class of fillers are traditional refractory fillers such as zircon, titanium dioxide, zirconium oxide, and silica in various forms, such as diatomaceous earth, ground amorphous silica glass and silica flour. The most preferred fillers are amorphous silica glass, silica flour, and the foregoing mixed with 1 to 50% ilmenite by weight.

A particularly preferred class of fillers are those which enhance the water-insolubility of alkali metal silicates by chemical reactions upon drying and firing at low temperatures. Such materials include zinc oxide, magnesium oxide, calcium oxide, as well as many silicates and aluminates of these compounds. Also, some of the thermally stable, water-insoluble alkaline earth phosphates, borates and the like can advantageously be employed in the compositions of the invention to enhance the hardness of films made therefrom and to react partially with the alkali metal silicate bond to enhance water resistance.

Another class of preferred fillers for the catalytic coating compositions of this invention include a variety of ceramic colored oxides and other pigment materials which are conveniently utilized to impart pleasing physical appearances to ceramic bodies. Such ceramic colored oxides and pigments are well known in the art and can be included in the compositions of the invention to enhance the aesthetic appearance of the compositions.

In addition, the compositions of the invention may contain suspending or thixotropic agents to maintain the suspended particulate catalytic constituents and fillers in a homogeneous state prior to the application of the compositions to the surfaces of a cooking device. Suitable suspending agents may be selected from naturally-occurring high molecular weight polysaccharides, such as alginates; sodium carboxymethyl cellulose; or inorganic suspending agents, such as colloidally dispersed asbestos and colloidally dispersed bentonite clay. Also, combinations of inorganic and organic suspending agents may be advantageously employed.

To reduce the likelihood of adverse affect of rapid drying of the coating compositions of the invention after application to a surface and the attendant "crazing" or mud-cracking of the coated surface, humectants may optionally be added. Humectants such as glycerin, ethylene glycol, diethylene or triethylene glycol, 1,3- or 1,2- propylene glycol can be used to the extent of about 0.1 to 5.0% by weight. The preferred humectant is glycerol in an amount of about 0.25 to 1% by weight.

In general, the compositions of the invention will be applied to a support. The material of the support can be any strong, rigid material including metals, ceramics, refractory glasses, polycrystalline glaze compositions such as porcelains, "Pyroceram", and the like or a combination of two or more of these. The requirements of a suitable support are that it can be formed into a convenient shape, that it possess appreciable strength and rigidity, and that it have sufficient thermal stability to resist softening, melting or decomposition at temperatures up to 760° C. (1400° F.) or somewhat higher.

The most preferred supports are those of structural metals such as steel, aluminum, copper, bronze, and various alloys of these as well as enamel coated supporting elements of the same metals. A particularly preferred support is a mild steel panel which has been "aluminized", i.e., thinly coated with aluminum or coated with a fused vitreous enamel coating of the type conventionally employed in preparing panels from which the interiors of ovens and similar devices are constructed. The support imparts enhanced rigidity, mechanical strength and shape to coatings or films made from the compositions of the invention.

In coating surfaces of cooking devices with the compositions of the invention the compositions are preferably freshly prepared just prior to coating. The catalytic metal oxide, metal carbonate or hydroxide, if one is to be added, and the alkaline silicate in the form of a liquid solution are first mixed. To the resulting slurry the thixotropic or suspending agent and filler may be added. This slurry can then be applied in any conventional manner, such as spraying, dipping or painting onto the surface of a previously prepared supporting element.

The support coated with the compositions of the invention is dried in any convenient manner and fired at progressively higher temperatures to eliminate volatile components and decompose thermally unstable constituents, such as the metal carbonate or hydroxide and possible organic additives.

Usually, it will be advantageous to dry the coating initially at relatively low temperatures to remove a major portion of the water and other solvents contained in the composition of the invention prior to firing the composition at higher temperatures. This preliminary drying step can be accomplished at room temperature or at higher temperatures up to and including the boiling point of water. Drying at temperatures higher than the boiling point of water is usually avoided because of the possibility of the formation of bubbles of water vapor which disturb the appearance of the coating. The continuity of the coating is disrupted when such bubbles break.

After the preliminary drying, the coated surface can be fired at higher temperatures, preferably in a progressive manner. Thus, the coated surface can be dried by raising the temperature slowly and continuously or by subjecting it to a series of gradually increased temperatures in a sequence of stages.

The final temperature at which the coated surface is fired depends in part upon the characteristics of the substrate or supporting element being used. For example, if a preferred mild steel member coated with a vitreous enamel is employed as the support, it is undesirable to raise the temperature beyond the softening point of the virtreous enamel coating, since such would lead to cracking and other surface imperfections.

When potassium silicate is used as a binder in the catalytic coating compositions of the invention, often certain heat treatments can be avoided. In general, coatings made from compositions of the invention containing potassium silicate as a binder become sufficiently hard and strong after drying at 150° C. that subsequent calcining or firing at higher temperatures during production of the coated surfaces of the invention can be omitted. Moreover, any firing necessary for coatings made from compositions containing potassium silicate as a binder will be achieved during normal usage of the oven in which the coated surfaces are installed.

During the firing process the metal carbonates or hydroxides contained in the coating compositions of the invention decompose, thereby liberating gases which enhance the porosity of the coated surface. This enhanced porosity results in effective and rapid oxidation and decomposition of cooking residues by the catalytic surfaces of the cooking device at temperatures of 204° C. (400° F.) and lower whereas for prior art coated surfaces temperatures in excess of 204° C. (400° F.) or even 260° C. (500° F.) are generally required to effect rapid oxidation of cooking residues.

An advantage of the compositions of this invention as compared to glass-bonded frits is that relatively low temperatures suffice to establish hard, abrasion-resistant, strong bonds. For instance, it is possible to obtain very strong, tough, hard coatings still retaining a desirable level of porosity by firing at temperatures which are normally employed in ovens used in the preparation of foodstuffs. Temperatures of 260° C. (500° F.) to about 316° C. (600° F.) are frequently encountered in ovens during normal use, and these temperatures suffice for the effective firing of compositions of this invention. Thus, the compositions of this invention may be applied to existing ovens by the housewife, and it is unnecessary, as would be the case with glass frits, for her to purchase a new oven or to send her old oven to a manufacturer to be specially coated.

In general, the water resistance of the compositions of the invention increases as the firing temperature is raised; but a firing temperature in excess of 649° C. (1200° F.) is rarely necessary even to obtain high levels of water and abrasion resistance in the resulting coating. As previously mentioned, water resistance can be enhanced, even at relatively low firing temperatures, by inclusion of reactive materials, such as zinc oxide, chrysotile asbestos, magnesium oxide, and the like. Such materials react with the silicate bonding agents to form a multiplicity of silica bonds with zinc or alkaline earth cations and such reaction products are quite water-insoluble.

Alternatively, substantially total water resistance can be achieved by dipping the coated surface or substrate, after drying, into a dilute solution of an acid which converts the alkali metal silicate into a rigid network of silica gel which is extremely water-insoluble.

The time required for drying and firing will depend somewhat upon the temperatures and temperature cycles employed. Generally, the higher the firing temperature, the lower is the required time. At 260° C. (500° F.) to 316° C. (600° F.) firing times of the order of an hour or even less are adequate; and at temperatures around 704° C. (1300° F.) firing times of a few minutes will suffice.

As previously stated, the relationship between the components in the composition must be such as to produce a coating having the necessary properties for the catalytic removal of the combustible soil. It is necessary to have adequate surface area, catalytic effectiveness, porosity and hardness to resist abrasion. The coated surfaces of this invention are capable of having porosity of about 10 to about 30%, preferably 15 to 25%, and still have hardness exceeding 3 on the Moh scale of hardness. It is not difficult to prepare a porous surface having the water adsorptivity implied by the foregoing range but to simultaneously produce a surface with the hardness and catalytic effectiveness of the surfaces of the invention one must closely follow the procedure disclosed herein.

The coating compositions of the invention are useful for providing catalytic surfaces on the walls, ceilings, floors, and other interior portions of ovens which are to be employed in the production of food or which otherwise might be subject to soiling with organic materials. Other uses of the compositions of the invention include the coating or lining of burners, of exhaust manifolds and tail pipes for internal combustion engines, and of manifolds and exhaust ducts from other domestic or industrial operations producing combustible odorous or offensive materials. The catalytic surfaces of the invention provide for removal of the objectionable materials by catalytic action which is generally called oxidation but includes the many complex reactions mentioned previously herein.

Porosity as used herein is determined by coating a small strip of sheet metal with the composition of the invention as described herein, boiling the sample in water for 2 minutes, and then allowing the water bath and sample to cool to room temperature. The water-saturated strip at room temperature is removed and excess water wiped off with a filter paper. The strip is immediately placed in a closed bottle and is weighed, the weight obtained being compared with the weight prior to the boiling experiment. The increase in weight indicates the water adsorbed by the film. The thickness and dimensions of the film are determined by micrometers and the volume calculated. The weight of water adsorbed is divided by the volume of the film to give a result which indicates the porosity.

Surface area is determined by nitrogen absorption as described in an article entitled "A New Method for Measuring the Surface Areas of Finely Divided Materials and for Determining the Size of Particles", by P. H. Emmett, in "Symposium on New Methods for Particle Size Determination in the Sub-Sieve Range", published by the American Society for Testing Materials, Mar. 4, 1941, page 95.

Hardness as used herein is determined by drawing a copper coin across the surface of a film formed according to this invention and examining the surface to determine whether or not a copper streak has been deposited. Since copper has a hardness of 2.5–3 on a Moh's scale, if the surface is not scratched by the copper coin, its hardness is greater than about 3.

The invention is further described by the following illustrative examples in which all percentages and parts are by weight unless otherwise specified.

EXAMPLE 1

To 69 parts of a sodium silicate solution having a composition of 32.0% $SiO_2$ and 11.1% $Na_2O$ and with a specific gravity of 42.5° Baume are mixed 25 parts of water and 6 parts of glycerol. The glycerol is standard CP grade material or USP XVII. The resulting solution is agitated and made uniform.

Forty parts of manganese dioxide having a surface area of 105 square meters per gram and being in the form of particles having a size of less than 35 microns are mixed with 40 parts of pulverized silicon dioxide, the particles of which have a size of less than 45 microns.

Sixty parts of the liquid solution prepared in the first paragraph, 2 parts of water, and 80 parts of the dry powder produced in paragraph 2 are rapidly and thoroughly mixed in a Waring blender or in a can placed in a paint can shaking device to produce a slurry.

A sheet of aluminized steel, approximately .16 cm. thick, 10.2 cm. × 10.2 cm., is thoroughly cleaned by detergent or by alkali carbonate treatment to remove all oil. The sheet is thoroughly dried and is then sprayed with the slurry described in the preceding paragraph by using a standard compressed-air sprayer to spray a film of the slurry onto the clean and dry sheet metal to a depth of 0.20–0.28 mm. A brush application is also possible, but the spray-gun technique produces a more attractive film.

The film is dried at about 66° C. (150° F.) for about 10 minutes and then is immediately calcined at 204°–260° C. (400°–500° F.) to complete the setting of the coating. The calcining operation can be for 3–30 minutes with the choice being selected for convenience of adapting to scheduling and manufacturing procedure. The finished coated sheet can be any dimension necessary for the proper assembly as a panel in a domestic cook-stove oven, tabletop broiler, or other similar appliance in which food soils are splattered or dripped.

In some cases it may be desirable to improve stability of the wet film when applied, i.e., the film will "run" thereby becoming thicker and even forming a ridge at the bottom edge of the panel. To improve the immobility of the film and simultaneously to improve the nonsettling characteristics of the slurry, 0.25% colloidal magnesium aluminum silicate, a thixotropic agent manufactured by R. T. Vanderbilt Co., Inc., 230 Park Avenue, New York, N.Y. 10017 can be uniformly mixed into the slurry to provide a stable slurry and a non-running, wet film. The amount of thixotropic agent can be varied as needed to give the optimum processibility. Other thixotropic agents as listed hereinbefore can be used instead of the magnesium aluminum silicate.

Evaluation tests are made on the panel just completed by placing the panel in an oven and applying a drop of corn oil to the surface at 204° C. The oil is removed within 15 minutes by the catalytic effect of the film, consisting primarily of oxidation but including also cracking and oxidative dehydrogenation.

The porosity of the film is determined to be 23%.

Hardness of the film is determined by drawing a copper coin across the surface. Microscopic examination of the surface indicates that copper has been deposited but no gouging or plowing away of the catalytic film has occurred. When the film is heated to 649° C. it loses no more than 15% of its initial porosity at 260° C.

Instead of manganese dioxide called for in the second paragraph of this example, one can use cobalt oxide, nickel oxide, copper oxide, zinc oxide or rare earths, or mixtures thereof to achieve special effects, such as the lightening effect produced by the rare earth oxides in which an almost white film is produced. When one of these oxides is used, a carbonate or hydroxide as described herein must also be employed. Oxidation characteristics, however, of the product are best with the use of manganese dioxide.

Other concentrations of sodium silicate may be used, or potassium or lithium silicate can be substituted in whole or in part, but sodium silicate is preferred. Instead of the glycerol one can use propylene glycol, ethylene glycol, diethylene or triethylene glycols or other humectant or mixtures thereof, but the preferred humectant is glycerol and the ratio as stipulated is preferred.

The preparation conditions are varied by altering the ratio of mixtures of the liquids described in the first paragraph of this Example to the solids described in the second paragraph of this Example such that porosities in the range of approximately 10% to as high as approximately 30% were attained. Film quality if acceptable in all cases but there was a tendency for lower activity as the porosity decreased and for the film to lose abrasion resistance as the porosity increased. Hence the range of porosity is acceptable but near 23% is preferable. Increasing the ratio of liquid decreased porosity whereas decreasing it increased porosity.

Calcining at 204°–260° C. (400°–500° F.) as stipulated in the fifth paragraph of this Example can be substituted by calcining the film at temperatures as high as 649° C. (1200° F.) or even above. As the temperature is increased, the ratio of liquids to solids is altered to increase the ratio of solids. The catalytic effectiveness of the film is somewhat lower when calcining is effected at temperatures above 538° C. (1000° F.), but adequate catalytic activity is retained for efficient soil removal. Loss of porosity during the high temperature calcining is in all cases less than 15% absolute.

The procedure described in this Example is repeated, but instead of the manganese dioxide having a surface area of 105 square meters per gram, manganese dioxides having surface areas of approximately 10, 20, 50, 80 and 123 square meters per gram are selected. All produced a satisfactory product when converted to a film having .18-0.31 mm. thickness. Below 0.15 mm. the quality of the film for catalytic effectiveness is lowered, whereas above .31 mm. the uniformity and aesthetics of the film deteriorate.

EXAMPLE 2

Compositions for both the liquid and the solid portions of the mixture are prepared as for Example 1 with the exception that instead of using pulverized silica alone, there is used a mixture comprising the same total parts by weight, but consisting of 75% silica and 25% pulverized ilmenite having a particle size such that 100% of the particles are less than 35 microns in diameter. A coated panel was made with this composition and was tested as described in Example 1. Rapid oxidation of soil was attained at approximately 177° C. (350° F.).

There was substituted for 25% of the manganese dioxide, manganese carbonate in the form of particles having a size of less than 25 microns and having a surface area in excess of 50 square meters per gram. The remaining part of the preparation of a film and testing was completed as described in Example 1 with the result that rapid oxidation was achieved at 177° C. (350° F.)

The film, like that of Example 1, can be calcined at temperatures to or somewhat above 649° C. (1200° F.). Apparently because of the carbonate inclusion or the ilmenite, activity of the film after the high temperature exposure is almost as good as after the lower temperature calcinings. As in Example 1 it is desirable to adjust solid to liquid ratios as well as carbonate to oxide and ilmenite to silica ratios to achieve the optimum film characteristics. Furthermore, calcining time can be lowered also to alter film characteristics; lowering the time usually is economically beneficial as calcining fuel requirements and equipment size are lowered.

Instead of manganese carbonate being used in the second paragraph of this example, there can be used a stoichiometrically equivalent amount of cobalt carbonate or hydroxide. These ingredients also must have a surface area of about 5 to 150 square meters per gram and particles of a size of less than 35 mircons.

EXAMPLE 3

A film was prepared as described in Example 1 with the exception that the manganese dioxide used had a surface area of less than 1 square meter per gram, although 100% of the particles were in the range of 2–15 microns in size. The film prepared from this composition failed to effect oxidation until the temperature of exposure was in excess of 274° C. (525° F.). This test was repeated, and instead of using the manganese dioxide stipulated in Example 1, the manganese dioxide had surface area of approximately 105 square meters per gram, but the material was in the form of particles of 40–50 microns in diameter. The film prepared from this composition also failed to produce satisfactory oxidation until the temperature was in excess of 260° C. (500° F.).

This example shows the need, not only for the manganese dioxide to be finely divided, but also for it to have high surface area initially for an effective catalytic film to be produced.

I claim:

1. A catalyst composition for coating the surfaces of cooking devices exposed to cooking residues, said composition containing 1. from about 10–94% by weight of a catalytic metal oxide selected from the group consisting of the oxides of cobalt, chromium, iron, nickel, manganese, copper, zinc, the rare earths and mixtures thereof in the form of particles having a size of less than 35 microns and a surface area of about 5–150 square meters per gram with the proviso that when the oxide is manganese oxide, from 0–80% by weight of said oxide can have a surface area in excess of about 150 square meters per gram;
2. at least 1% by weight on a dry basis of an alkaline silicate selected from the group consisting of sodium silicate, lithium silicate, potassium silicate, silicates of organic bases having a basic dissociation constant greater than $10^{-3}$ and mixtures thereof, said alkaline silicate being in the form of an aqueous solution; and
3. from about 0–20% by weight of a carbonate or hydroxide of one or more metals of said catalytic metal oxides when the catalytic metal oxide of (1) is manganese oxide and from about 1–20% by weight of said carbonate or hydroxide when the catalytic metal oxide of (1) is other than manganese oxide.

2. The composition of claim 1 containing in addition up to about 70% by weight of a refractory filler.

3. The composition of claim 2 wherein the refractory filler is silica.

4. The composition of claim 3 wherein from about 1 to about 50% by weight of the refractory filler is ilmenite.

5. The composition of claim 2 containing in addition a thixotropic agent.

6. The composition of claim 1 wherein the catalytic metal oxide is manganese oxide.

7. The composition of claim 6 wherein the manganese oxide is manganese dioxide.

8. The composition of claim 6 wherein the carbonate is manganese carbonate and the alkaline silicate is sodium silicate.

9. The composition of claim 6 containing in addition a refractory filler.

10. The composition of claim 9 wherein the refractory filler is silica.

11. The composition of claim 10 wherein from about 1 to 50% by weight of the refractory filler is ilmenite.

12. The composition of claim 9 containing in addition a thixotropic agent.

13. The composition of claim 6 wherein the concentration of component (3) is zero.

14. The composition of claim 13 wherein the alkaline silicate is sodium silicate.

15. The composition of claim 13 containing in addition a refractory filler.

16. The composition of claim 15 wherein the refractory filler is silica.

17. The composition of claim 16 wherein from about 1 to 50% by weight of the refractory filler is ilmenite.

18. The composition of claim 15 containing in addition a thixotropic agent.

19. A surface capable of catalyzing the decomposition and oxidation of cooking residues at temperatures below 204° C. comprising a support coated with the composition of claim 1 and thereafter fired at temperatures above about 204° C., said surface having a porosity ranging from about 10 to 30%, a hardness in excess of 3 on moh's scale and losing no more than 15% of its initial porosity at 260° C. when heated to temperatures up to 649° C.

20. A surface capable of catalyzing the decomposition and oxidation of cooking residues at temperatures below 204° C. comprising a support coated with the composition of claim 5 and thereafter fired at temperatures above about 204° C., said surface having a porosity ranging from about 10 to 30%, a hardness in excess of 3 on Moh's scale and losing no more than 15% of its initial porosity at 260° C. when heated to temperatures up to 649° C.

21. A surface capable of catalyzing the decomposition and oxidation of cooking residues at temperatures below 204° C. comprising a support coated with the composition of claim 6 and thereafter fired at temperatures above about 204° C., said surface having a porosity ranging from about 10 to 30%, a hardness in excess of 3 on Moh's scale and losing no more than 15% of its initial porosity at 260° C. when heated to temperatures up to 649° C.

22. A surface capable of catalyzing the decomposition and oxidation of cooking residues at temperatures below 204° C. comprising a support coated with the composition of claim 8 and thereafter fired at temperatures above about 204° C., said surface having a porosity ranging from about 10 to 30%, a hardness in excess of 3 on Moh's scale and losing no more than 15% of its initial porosity at 260° C. when heated to temperatures up to 649° C.

23. A surface capable of catalyzing the decomposition and oxidation of cooking residues at temperatures below 204° C. comprising a support coated with the composition of claim 12 and thereafter fired at temperatures above about 204° C., said surface having a porosity ranging from about 10 to 30%, a hardness in excess of 3 on Moh's scale and losing no more than 15% of its initial porosity at 260° C. when heated to temperatures up to 649° C.

24. A surface capable of catalyzing the decomposition and oxidation of cooking residues at temperatures below 204° C. comprising a support coated with the composition of claim 13 and thereafter fired at temperatures above about 204° C., said surface having a porosity ranging from about 10 to 30%, a hardness in excess of 3 on Moh's scale and losing no more than 15% of its initial porosity at 260° C. when heated to temperatures up to 649° C.

25. A process for making a surface capable of catalyzing the decomposition and oxidation of cooking residues at temperatures below 204° C. comprising the steps of 1. pulverizing manganese oxide in the form of particles having a size of greater than 35 microns and at least 20% by weight of which has a surface area of from about 5–150 square meters per gram to reduce the particle size to less than 35 mirons;
2. preparing a catalytic coating composition by mixing manganese oxide from step (1) in an amount of about 10–94% by weight with at least 1% by weight on a dry basis of an alkaline silicate selected from the group consisting of sodium silicate, lithium silicate, potassium silicate, the silicates of organic bases having a basic dissociation constant greater than $10^{-3}$, and mixtures thereof, said alkaline silicate being in the form of an aqueous solution and said weight percentages being based on the weight of the total composition;
3. coating a support with the catalytic coating composition of step (2); and
4. firing the coated support at a temperature above about 204° C.

26. The process of claim 25 wherein the manganese oxide is manganese dioxide.

* * * * *